Patented Dec. 6, 1932

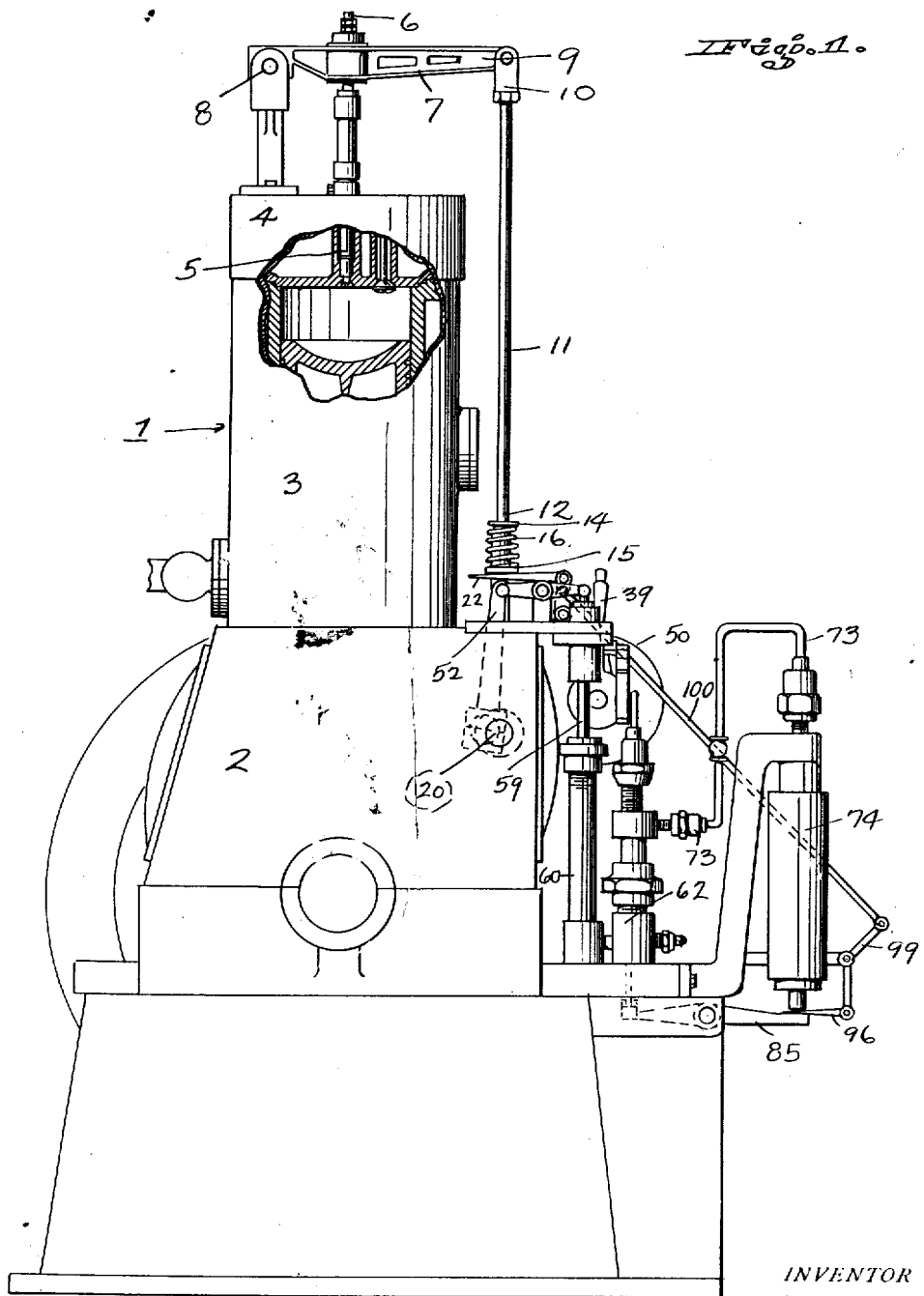

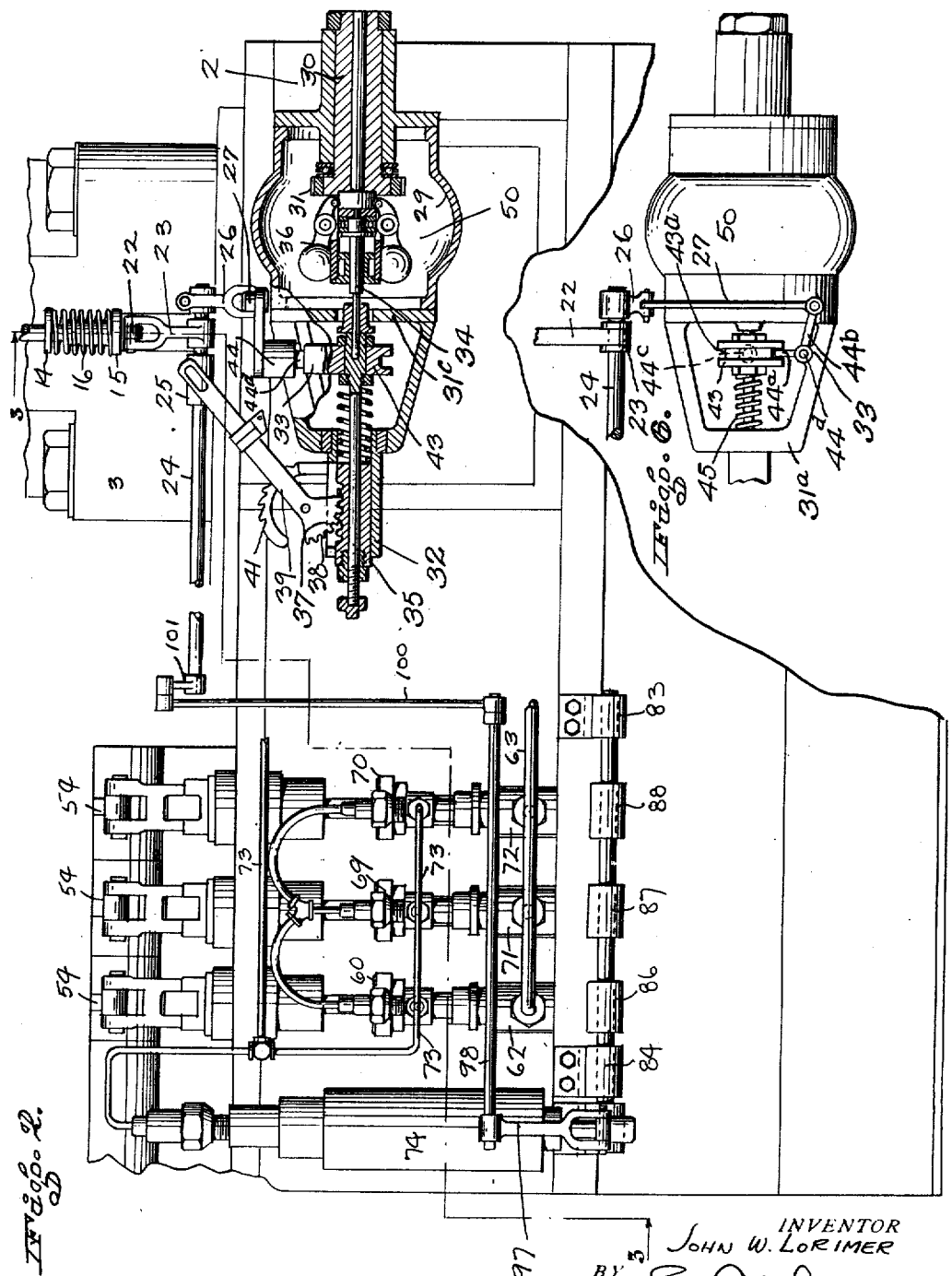

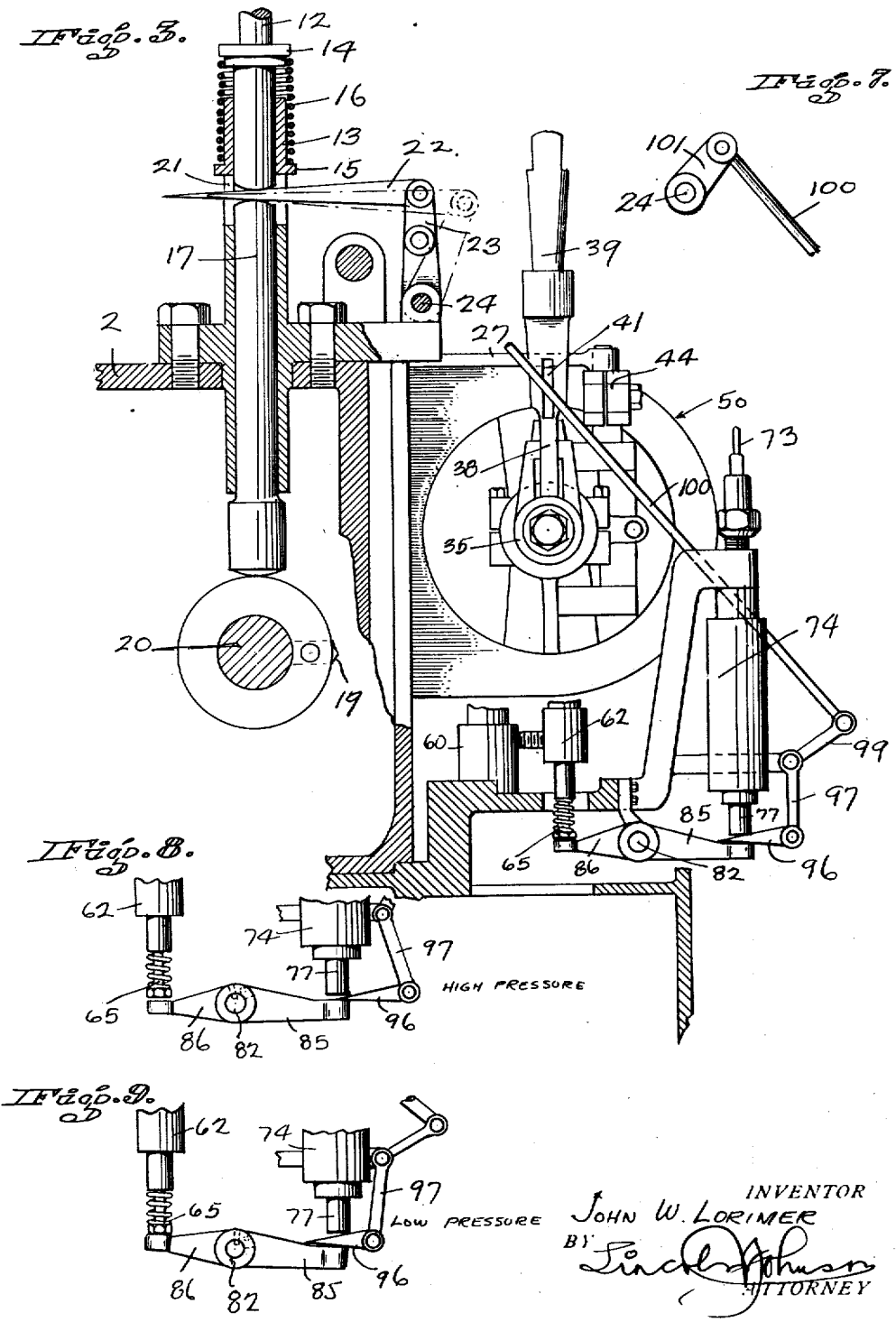

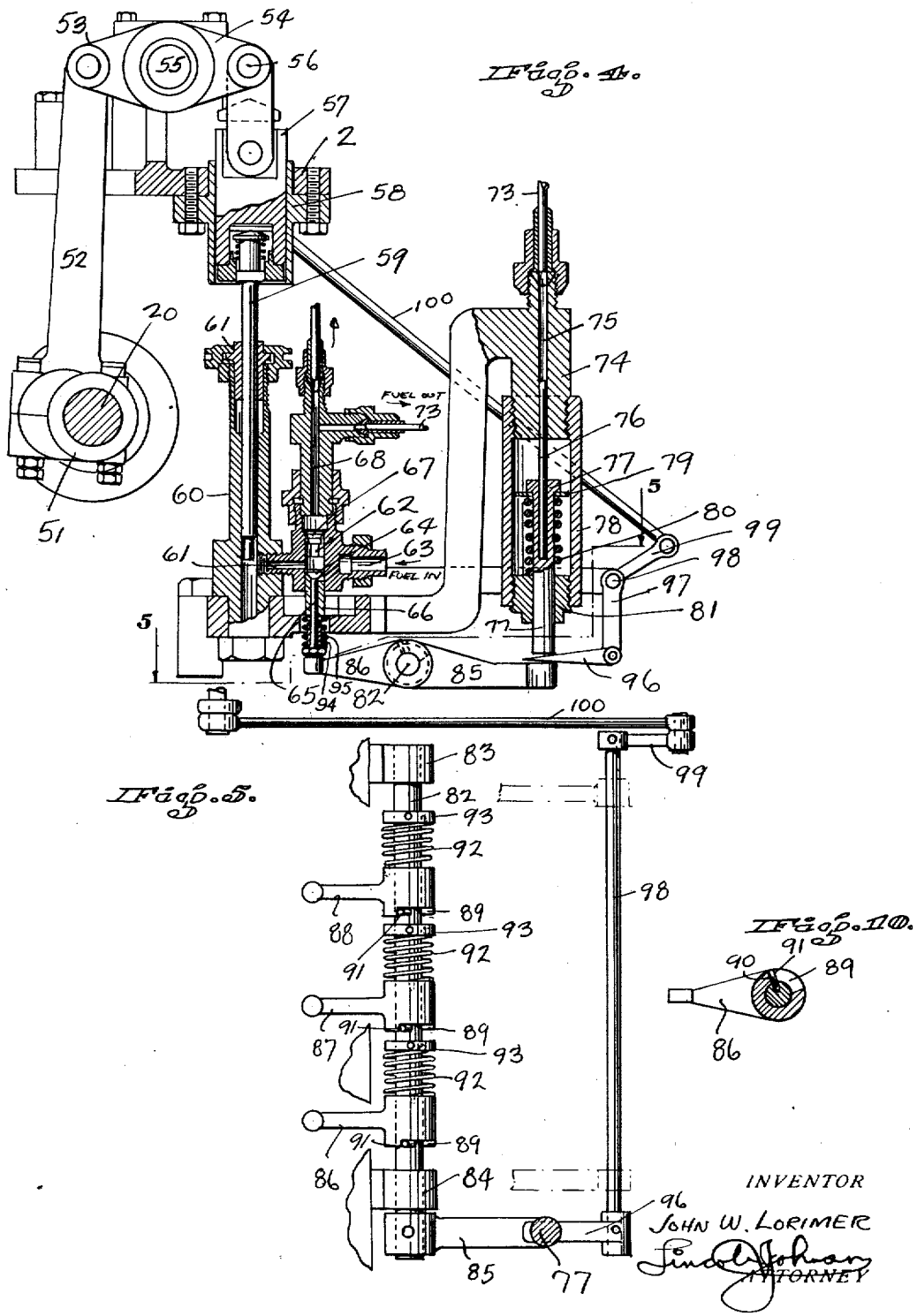

1,890,225

UNITED STATES PATENT OFFICE

JOHN W. LORIMER, OF OAKLAND, CALIFORNIA

DIESEL ENGINE SPEED GOVERNOR AND APPARATUS TO RELIEVE FUEL OIL PRESSURE ACCUMULATION

Application filed June 28, 1926. Serial No. 119,023.

This invention relates particularly to an apparatus adapted to relieve an accumulation of the fuel oil pressure, on an engine of the "Diesel" type, above a pre-determined pressure.

An object of the invention is to provide an oil pressure accumulator on the fuel oil pressure line of a "Diesel" engine, that is capable of operating in conjunction with the fuel oil pumps to prevent the fuel oil pressure exceeding a predetermined pressure.

A further object of the invention is to provide on an internal combustion engine, an apparatus to prevent oil pressure in excess of a predetermined pressure in combination with an apparatus to control the duration of the period during which fuel oil is injected into the engine cylinders.

A still further object of the invention relates to an apparatus adapted to be applied to internal combustion engines of the "Diesel" type, to automatically regulate and control the periodic injection of the fuel oil into the engine cylinders.

Another object of the invention is to provide means to automatically govern and regulate the fuel injecting apparatus of an internal combustion engine, to either shorten or lengthen the fuel injection period, in combination with mechanical means on the automatic governing means to permit manual control there. Other objects and advantages will appear as this description progresses.

In this specification and the annexed drawings the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying four sheets of drawings;

Fig. 1 represents a side elevation of an internal combustion engine having a speed governing apparatus and fuel pressure regulatory apparatus applied thereto, constructed in accordance with my invention.

Fig. 2 is an enlarged side elevation of a fragmentary portion of Fig. 1 showing the fuel oil throttle governor and oil pressure pumps and accumulator operatively connected.

Fig. 3 is an enlarged end elevation, partly in section, of a portion of Fig. 2, taken on the line 3—3 of Fig. 2.

Fig. 4 is an enlarged end elevation, partly in section, showing the oil pressure generating apparatus connected to an apparatus to relieve excess oil pressure, constructed in accordance with my invention.

Fig. 5 is a plan view taken on the line 5—5 of Fig. 4, showing the apparatus to unseat the fuel oil back pressure check valves.

Fig. 6 is a fragmentary plan view showing the apparatus that connects the governor to the throttle shaft.

Fig. 7 is a detail that shows the connection between governor control shaft and the rod which is connected with the wedge of the pressure regulator.

Fig. 8 is a fragmentary side elevation showing the rocker arm, that lifts the back pressure fuel oil valves on the fuel oil pressure pumps, in an inoperative position.

Fig. 9 is a view similar to Fig. 8, showing one of the back pressure valves unseated to prevent an accumulation of oil pressure above a predetermined pressure.

Fig. 10 is a cross section taken through Fig. 5.

In detail the construction illustrated in the drawings comprises, an internal combustion engine of the "Diesel" type, generally designated by the numeral 1, consisting of the crank case 2, cylinder block 3 and cylinder head 4. The cylinder head 4 is provided with conventional inlet and exhaust valves therein operated by rocker arms, or the like, which in turn are actuated by lift rods extending through the crank case into contact with the engine cam shaft in a conventional manner, not necessary to be described herein.

The engine illustrated is of the "Diesel" type wherein fuel oil, under pressure, is injected through a fuel nozzle 5 into the engine cylinder. The fuel nozzle 5 has a needle valve 6 therein actuated or lifted by a rocker arm 7 pivotally mounted at 8 on the cylinder head 4. The free end 9 of the rocker arm 7 has an end 10 of a lift rod 11 pivotally connected thereto and the lower end 12 of the lift rod is slidably confined in a guide member 13 mounted on the crank case 2. A shoulder 14 is provided around the lift rod 11 and a similar shoulder 15 provided around the guide member 13, and between said shoulders an expansion spring 16 is confined to assist in elevating the lift rod.

An auxiliary lift rod 17 is reciprocatingly arranged within the guide member 13 in axial alignment with the lift rod 11, said auxiliary lift rod 17 contacting with the fuel cam 19 mounted on the engine cam shaft 20. The guide member 13, at a point adjacent where the proximate or juxtaposed ends of lift rod 11 and auxiliary lift rods 17 meet, is slotted diametrically therethrough at 21, to receive an adjustable wedge member 22.

The wedge 22 is adapted to enter between and to separate the meeting or juxtaposed ends of the lift rod 11 and auxiliary lift rod 17. The wedge 22 is moved inwardly, in the slot 21 in the guide member 13, in order to separate, viz., in order to effect a moving further apart of the juxtaposed ends of the lift rod 11 and the auxiliary lift rod 17, or outwardly to allow the ends of the lift rod 11 and auxiliary lift rod 17 to approach each other or even to come together. Said movements of the wedge are obtained by means of a fulcrum arm 23 that is pivotally mounted on and secured to a shaft 24, rotatively journaled in bearings 25 provided on the crank case 2. The said shaft 24 is provided with a depending arm 26 fixedly secured thereon, (which in a turn is pivotally connected by a system that includes a link 27 and a bell crank lever 44 to a governing apparatus 50) for imparting a rotatable effect to the said shaft and causing a lateral movement of the wedge 22 with respect to the lift rods 11 and 17.

The wedge 22 is moved inwardly and outwardly beneath the end of the lift rod 11, viz., between the proximate ends of lift rod 11 and auxiliary lift rod 17 to respectively effect a lengthening or shortening of the lift rods as a set. This lengthening or shortening of the effective length of the lift rods as a set, respectively, results in correspondingly lengthening or shortening the period or duration of time during which fuel oil will be injected into the engine cylinder. When the smaller tapered end of the wedge 22 is in contact with the end of the lift rod 11, or when the wedge is entirely out of engagement with the lower end of the lift rod 11, the maximum of lift by cam 19 in elevating the said lift rod 11 results in actuating the needle 6 of fuel nozzle 5 so as to inject a minimum charge of fuel oil into the engine cylinder. When the engine is "idled" or run under similar slow speed conditions with or without load, a minimum charge of fuel oil is injected into the engine cylinder and automatically controlled by the governing apparatus. The speed of an engine may not always be kept constant, during the "idling" period, but very nearly so, and any appreciable fluctuation that may occur in the engine speed below a desired constant, either from an insufficient charge of fuel being supplied or other deterrent conditions, is automatically compensated for by an increased fuel charge initiated by lateral inward movement of the wedge 22 relative to the lift rod 11 by the governing apparatus 50. As the engine speed decreases, the wedge 22 moves inwardly to elevate the lift rod 11, viz., to lengthen the effective length of the lift rod 11 and the auxiliary lift rod 17 as a set, and to increase the time that the fuel valve is held open. The fuel cam 19 then elevates the lift rod 11, sooner, viz., earlier in the stroke, and holds it elevated longer, than when the wedge 22 is not under the said lift rod or than when only the edge portion of the wedge is between the proximate ends of rods 11 and 17, and an increased charge of fuel is injected into the engine and acts to restore its speed to that of the predetermined constant.

The wedge 22 is moved in and out in the manner described by the depending arm 26 on the shaft 24, connected through the system that includes the link 27 and bell crank lever 44 to the governing apparatus 50. The governing apparatus consists of a casing 29 within which a hollow shaft 30 is rotatably journaled. The shaft 30 has a gear 31 thereon meshing with a gear, (not shown) secured on the engine cam shaft 20. One end of the hollow shaft 30 is provided with a "ball-governor" 36 or other equivalent governing device, thereon; said governor 36 has as a part thereof a longitudinally extending shaft 34 that extends outwardly through an end 31c of the casing 29 and into and through a guide bearing or member 35 that is slidably mounted in an outer frame member or sleeve member 32 which is in turn carried by an outwardly extending portion of or on the end casing member 31c. The guide bearing 35 is formed with a gear rack 37 to engage the gear segment 38 on the end of a lever 39 that is pivotally mounted at 40 on the outer frame member 32 and movable relative to a notched quadrant 41, said lever being provided with a spring actuated detent thereon (not shown) which may be placed into and out of engagement with the notched quadrant to hold the lever in a number of different operating positions.

The shaft 34 is provided with a grooved collar 43 securely fixed thereon between the casing 29 and the guide bearing 35, said collar being pivotally joined by a bell crank lever 44 (having yoke-shaped arms 44a with pins 44c that engage the grooved portion of the collar and arm 44b connected to link 27) and link connection 27 to the depending arm 26 on the wedge control shaft 24. The lever 39, through its engagement with the toothed end of the guide bearing 35 will move said shaft and the collar 43 either to or from the ball-governor 36, and hence regulates and controls the maximum and minimum movements of the said governor.

An expansion spring 45 is arranged around the shaft 34 between the collar 43 and the guide bearing 35 for the purpose of actuating the collar 43 and causing it to tend to force the wedges 22 inwardly between the proximate ends of the lift rod 11 and auxiliary lift rod 17. The wedge member 22 is placed into operative position by movement imparted thereto through the medium of arm 23, shaft 24, depending arm 26, link 27, and bell crank lever 44, the latter of which is moved by the collar 43. When the engine is running, the collar 43 is moved under the influence of the ball governor against the expansion spring 45, which continuously presses against the collar. The effect of this expansion spring on the collar can be varied by the hand-control lever 39 which can be moved and positioned so as to move, and position, through the medium of the segment 38 on the lever and the gear rack 37 on the guide member 35, the guide bearing or member 35 whereby the spring will be initially compressed according to the position of the guide bearing or member.

The spring 45 forms a yieldable connection between the movable guide bearing 35 and the shaft 34 and the construction described permits an independent functioning of the setting or adjusting lever 39 on the one hand and the ball governor 36 on the other hand. This permits the adjusting lever to be set by means of the notched quadrant and the detent to control the speed conditions under which the governor will begin to function to move the wedge 22 from the normal position while at the same time the spring 45 will permit the ball governor, when the speed exceeds a predetermined amount, to automatically move the wedge to reduce the fuel charge.

As previously indicated, the arm 44a of the bell crank lever 44 is in the form of a yoke having spaced horns or ends that provide the free end (or free ends) of the arm 44a and in these free ends there are the pins 44c that enter a grooved portion 43a, of collar 43 whereby the arm 44a moves in response to the longitudinal movement of the collar.

The bell crank lever 44 comprises not only the arms 44a and 44b but also the vertically and transversely extending shaft 44d to which said arms are fixedly secured whereby the bell crank lever in effect is provided.

The shaft 44d is carried in a bearing 33 that is on an arm or portion 31a projecting outwardly from the end member 31c.

From what has preceded, it will be clear that the bearing construction is such that the lever 44 and parts connected thereto will move in response to and under the influence of the collar 43.

The governing apparatus is timed to regulate the wedge member 22 so that under normal "idling" conditions of the engine, a minimum charge of fuel will be injected into the said engine. Fluctuations that occur above or below the idling speed are automatically compensated for by the governing apparatus. If the operator should desire to increase the speed of the engine above the idling speed the handle 39 would be moved to a predetermined fixed position on the quadrant 41. Movement of the handle, as described simultaneously, places the wedge 22 viz., moves it inwardly beneath the fuel valve lift rod, and thus tends to keep the said lift rod elevated for a longer period, and consequently to increase the volume of fuel injected into the said engine. Any fluctuations in the engine speed, above or below a predetermined speed are likewise compensated for by the governing apparatus exercising a mechanical control over the laterally movable wedge.

Although I have referred to the wedge 22, the wedge operating mechanism and the engine structure generally in the singular, I wish it to be understood that it is entirely within the purview of the invention to increase the length of the shaft 24 to accommodate a plurality of wedges, all of which would be simultaneously controlled by the single governing apparatus provided.

The apparatus heretofore described has referred particularly to the mechanism for controlling the fuel injection into the engine. In the description following, the operation of the fuel oil pressure pumps and the apparatus to regulate the predetermined oil pressure, will be described.

The cam shaft 20 of the engine has an end thereof extended through and out of the crank case 2, (see Fig. 4). An eccentric 51 is connected to the end of the cam shaft 20, and a connecting rod 52 is rotatably connected to the eccentric 51. The free end of the connecting rod 52 is pivotally secured to an end 53 of a rocker arm 54 fixed on a shaft 55 that is journaled on the crank case 2. The opposite end of the rocker arm is pivotally connected at 56 to a cross head 57 that is reciprocatingly guided in a bearing 58 formed in the crank case 2. The cross head 57 has a pump piston or plunger 59 secured thereto. The plunger 59 is reciprocatingly guided in a pump casing 60 that is mounted upon the crank case 2. The plunger 59 is packed at 61 in a conventional manner to prevent any oil pressure losses.

Similar rocker arms 54 are fixed on the shaft 55 in offset relation and each rocker arm has a pump plunger 59 on the end thereof working in the respective pump casings, or pumps, 69 and 70.

The chamber of pump 60 is connected by a passage 61 to a valve chamber housing 62. The valve chamber housing 62 communicates with a fuel oil inlet passage 63 that leads to a source of supply (not shown). A back pressure valve 64 is positioned between the oil inlet passage 63 and the passage 61 that leads to the pump chamber. The valve 64 is provided with a stem 65 thereon that is guided in a bearing 66 and the stem 65 extends below the lower end of the bearing 66. Thus on the upward suction stroke of the plunger 59, oil is drawn from the inlet passage 63 past the valve 64, which is lifted by the suction, and the oil is passed into the pump chamber. On the downward, compression stroke of the plunger 59, the oil is forced back through the passage 61 into the valve chamber 62, closing the back pressure valve 64 and forcing the oil under pressure upward past the back pressure valve 67 into the conduit 68 through which the oil pressure is conducted to the fuel nozzle 5, and through which it is injected into the engine cylinder in the manner heretofore described.

Although I have shown in Fig. 4 a section through a single pump and described the operation thereof, in relation to the necessary back pressure valve structure, I have found that a more uniform generation of oil pressure is obtained by providing a plurality of pumps in series, as shown in Fig. 2. In Fig. 2, I have illustrated the three plunger pumps, 60, 69 and 70 that are all identically similar in construction, to the individual pump 60 heretofore described. Each of the pumps shown in Fig. 2 are provided with back pressure valve housings 62, 71 and 72, like the one heretofore described.

The oil that is pumped from the valve chamber housings 62, 71 and 72 passes into the connected conduits 68 and thence passes to the fuel injection nozzles. The fuel supply conduits 68 are communicated by a conduit 73 to an oil pressure regulator 74, sometimes herein referred to as an accumulator capable of preventing the fuel oil exceeding a predetermined pressure. The regulator 74 is adapted to receive the total oil pressure pumped from all of the individual pumps 60, 69 and 70. The pressure regulator consists of a casing 74 having a central chamber 75 therein, in which a plunger 76 is reciprocatingly guided. The lower end of the plunger 76 is secured to a lift rod 77 that is guided in a frame 78, secured to the lower part of the pressure regulator 74. A shoulder 79 is fixed on the lift rod 77. An expansion spring 80 is confined between the shoulder 79 and an adjustable nut 81 that is threaded into engagement with the lower end of the guide member 78. The oil pressure that enters the chamber 75 forces against the end of the plunger 76 and exerts compressive action on the spring 80 and forces the rod 77 downwardly relative to the guide member 78. As the oil pressure decreases, the spring 80 raises to restore the plunger 76 to its normal position. The three pumps 60, 69 and 70, being of the reciprocating type, cause the oil pressure to fluctuate above and below a predetermined pressure and the pressure regulator with the spring 80 therein, serves to maintain the oil pressure at a substantially constant pressure without any fluctuations or variations therein.

In the normal operation of the regulator, the adjusting nut 81 is set, relative to the spring 80, to maintain the oil pressure at a selected and predetermined pressure, although, of course, this pressure will vary proportionately in accordance with the speed of operation of the engine. In order to prevent oil pressure in excess of a predetermined pressure, from accumulating in the supply conduits leading to the fuel nozzles, I have provided means operated by the pressure regulator, that will not permit oil pressure in excess of the predetermined pressure to be forced into the fuel nozzle oil supply lines. It is a conventional practice in the operation of Diesel engines to provide a pressure regulator or safety valve to automatically relieve excessive oil pressures, but this practice throws an undue amount of work on the pressure regulator, that tends to impair its efficiency, and in time to render it inoperative and ineffectual for the functions desired to be accomplished by it. In my invention, I utilize a pressure regulator to receive the full force of the pressure that is generated by the oil pumps, and in order to prevent this pressure from exceeding a predetermined head, I provide a shaft 82 that is journaled at its opposite ends in bearings 83 and 84 mounted on the crank case 2. The shaft 82 is provided with an arm 85 thereon, that registers with the lower end of the rod 77 extending from the pressure regulator 74. The rod 77 is adapted to depress the arm 85 and to partially rotate the shaft 82. The shaft 82 is provided with a plurality of fingers 86, 87 and 88 loosely mounted thereon, in locations corresponding to those of the stems 65 of the back pressure valve 64 in the respective valve chamber housings 62, 71 and 72.

Each of the fingers 86, 87 and 88, where they are journaled around the shaft 82, have a segmental portion 89 cut out to form a shoulder 90. Pins 91 are fixed on the shaft 82 to rest in each of the segmental slots 89. The pins 91 do not move the fingers into contact with the back pressure valves 64, to unseat the valves, because the oil pressure in the regulator is equal to that on top of the valves 64 and hence the pressure on top of the valves 64 will balance the lifting pressure of the fingers. If the pins 91 through the fingers did actually try to lift the valves 64 against the oil pressure in the valve chamber, from the urging of the pressure in the regulator, it is probable that the fingers or pins would be broken off. A plurality of clock springs 92 are each secured at one end thereof to the respective fingers 86, 87 and 88 and at their opposite ends to collars 93 provided on the shaft 82. The fingers 86, 87 and 88 are freely rotatable on the shaft 82 and the respective clock springs 92 cause the free ends of the fingers to engage the lower ends of the back pressure valve stems 65. Thus, as the rod 77 on the pressure regulator moves downwardly into contact with the arm 85, the shaft 82 is partially rotated and the pins 91 are moved out of contact with the shoulder 90 on the fingers 86, 87 and 88 and the said fingers are elevated by the springs 92 to unseat one or more of the back pressure valves 64 to thereby effectually neutralize the action of the pump plungers 59. I have shown three fingers 86, 87 and 88 to operate a corresponding number of back pressure valves 64. The tension of the individual springs 92 through the fingers is not sufficient to unseat any one of the valves 64 on down strokes of the pump plungers 59 but on the suction strokes of the plungers 59 the spring tension is sufficient to cause one or more of the fingers to unseat a valve or valves. The back pressure valves 64 are only opened when the oil pressure builds up in the pressure regulator to a point where the plunger therein is depressed into contact with the arm 85 to permit operation of the fingers 86, 87 and 88. The fingers 86, 87 and 88, being spring actuated, would remain in constant contact with the valves 64 were it not for the pins 91 which keep the fingers out of contact with the valve stems. As soon as the pressure regulator releases the fingers, they move into contact with the valve stems and the fingers "feel" whichever valve stem has its pump plunger on the suction stroke and in that unit the valve 64 would be unseated. On the suction stroke of the plungers there is no pressure and hence the spring fingers can lift the check valves. As soon as the oil under pressure in the oil line above the valve 67 in each of the housings, (which is not affected in any way by the operation of the pressure regulator 74) has been used up by the fuel nozzles, the plunger in the pressure regulator moves to an inoperative position, causing the pins to move the fingers out of contact with the back pressure check valves 64, allows the same to close and permits the oil pressure pumps to again generate oil pressure in the system.

I have provided a plurality of fingers 86, 87 and 88 to operate the individual back pressure check valves, so that one, two or more of the back pressure check valves may be lifted on the suction stroke of the related pump to prevent any excessive oil pressure being generated in the oil supply line. Each of the valve stems 65 is provided with a collar 94 therearound, to limit the up stroke movement of the said valve, and a like spring 95 is provided around each valve stem to return it to a closed position after the spring urged lifting action of the fingers 86, 87 and 88 has been taken therefrom.

The oil pressure in the fuel line may be regulated by adjusting the tension of the spring 80 so as to vary the operating pressure of the plunger 76 in the regulator. This may be accomplished either by adjustment of the nut 81, or by inserting a control wedge 96 between the pressure regulator rod 77 and the arm 85 that is actuated thereby. By regulation of the space between the pressure regulator rod 77 and the arm 85, the functioning of the back pressure check valve 64 is controlled. In the present invention I have shown a wedge 96 that is adapted to be moved in or out between the rod 77 and arm 85. Although it would be clearly within the scope of the invention to make the shaft 82 an eccentric shaft and provide means to vary the space between the arm 85 on the shaft 82 and the bottom of the rod 77. The wedge 96 causes the rod 77 to be lifted upward within the regulator 74, and hence when it is interposed between the rod 77 and arm 85, reduces the pressure of the oil. In Fig. 8, I have shown the wedge out of contact of the rod 77 and arm 85, and in this position, the regulator 74 allows the oil pressure to be built up to the maximum. In Fig. 9 I have shown the wedge inserted between the rod 77 and arm 85, in which position, the back pressure valves 64 are caused to be lifted for a longer period than when the wedges are pulled out, and as a result the oil pressure can not be built up to an undesirable point. I have shown the wedge 96 connected to an arm 97 of a bell crank that is pivoted at its elbow 98 to the engine crank case 2. The opposite arm 99 of the bell crank is connected by a lever 100 to an arm 101 that is connected to an end of the governor throttle shaft 24.

Movement of the throttle shaft 24 to move the wedges 22 inwardly or outwardly between the lift rods 11 that actuate the fuel nozzles causes synchronous movement of the wedge 96 relative to the pressure regulator 74. While the governor may be used to operate the fuel injection nozzles at a constant speed, said governor may also be utilized to automatically operate the pressure relief valves. Although I have shown the apparatus for relieving excess oil pressures connected directly to the fuel oil throttling means, I do not wish to be limited thereto, as it would be clearly within the purview of the invention to substitute some other form of operating means for the oil pressure accumulator. In starting the engine into operation, the wedges 22 are moved inwardly or are inwardly positioned, while the wedge 96 is moved outwardly or is outwardly positioned. The thicker portions of the wedges 22 will thus cause the rods 11 to be lifted so as to separate the lift rods 11 and auxiliary lift rod 17 sufficiently to allow a relatively large charge of fuel to be injected into the engine cylinder and at a high pressure, which high pressure is due to the regulation of the pressure in the accumulator by the wedge 96. As the wedges 22 are moved under the lift rods 11, to increase the engine speed and power, it is obvious that greater pressure on the fuel oil is necessary. The wedges 22 being operated in unison with the wedge 96 it is apparent that the wedge 22 should move inwardly and that the wedge 96 should move outwardly to permit an increase in the pressure to be maintained in the fuel supply line. As the thick part of the wedge 96 moves out from under the accumulator a greater pressure on the fuel oil is built up, to compensate for the additional amount of fuel required by the engine due to its increased speed. Through the related action of the wedges 22 and wedge 96, I maintain low pressure on the fuel when the engine fuel consumption is small and automatically raise the fuel pressure as the engine's fuel consumption increases. As illustrated in Fig. 3 of the drawings the wedge 22 is shown in full lines as having moved inwardly from the dotted line position illustrated in the said figure. In the dotted line position shown in Fig. 3, the thin portion of the wedge 22 is in operation and in the full line position of the wedge 22 in Fig. 3 the said wedge has moved inwardly a considerable distance so that a thick portion of the wedge 22 is in operation. Also, in Fig. 3 of the drawings the wedge 96 is shown in full lines with its thin portion in operation. With the arrangement illustrated in Fig. 3 of the drawings a thick portion of the wedge 22 is in operation and the thin portion of the wedge 96 is in operation and the lever connections between the wedges 22 and 96 and the governor actuated shaft 24 are such that when the wedge 22 moves outwardly from the full line position shown in Fig. 3 to bring its thin portion in operation, the wedge 96 will move inwardly to bring its thick portion in operation.

Having thus described this invention, what I now claim and desire to secure by Letters Patent is:

1. An apparatus to regulate the fuel pressure in the fuel line of a Diesel engine, which apparatus is comprised of a plurality of fuel pumps connected to said fuel line; a valve in each pump to regulate the entry of fuel thereto; a pressure regulator, operable by the combined pressures developed in the fuel line by said pumps; a plunger in said regulator to be reciprocated proportionately to the pressure transmitted to said regulator from said fuel line; a shaft; spring pressed fingers on said shaft, each finger normally occupying a restrained position adjacent to, but so that by the energy of its spring when the finger is released it can move, one of said valves; an arm on said shaft to be moved by said plunger to release said fingers so that each can impart a limited movement to the valve adjacent thereto when pressure above a predetermined amount is developed in said line.

2. An apparatus to regulate the fuel pressure in the fuel line of a Diesel engine, which apparatus is comprised of a plurality of pumps connected to said fuel line, a valve in each line of said pumps to regulate the entry of fuel thereto; a pressure regulator having a plunger therein to be reciprocated proportionately to the combined pressures developed by said pumps, a spring pressed finger pivoted adjacent each valve to open the same; each of said fingers being restrained as to movement by a positionable stop; means providing said stops, which means is adapted to be operated by said plunger so as to position said stops; and adjustable means inserted between said plunger and said stop-positioning means to affect the operating of said plunger on said positioning means, said adjustable means being governed by the speed-governing apparatus of the engine.

3. An apparatus to regulate the fuel pressure in the fuel line of a Diesel engine comprised of a fuel pump connected to said fuel line; a pressure regulator operable by the fluid pressure developed by said fuel pump; a valve in said pump to determine the entry of fuel thereto; said pressure regulator being dependent for its functioning upon a member proportionately positionable in accordance with the pressure within the regulator; means to connect the positionable member of the pressure regulator to said valve to determine the opening and closing movements of said valve in accordance with the position of said positionable member and so as to maintain a predetermined pressure in said fuel line, and means automatically controlled by the speed-governing device of the engine for affecting the control of the opening or closing of said valve by said regulator.

4. An apparatus to regulate the fuel pressure in the fuel line of a Diesel engine comprised of a fuel pump connected to said fuel line; said fuel pump having a control valve for determining the entry of fuel thereto; a pressure regulator operable by the fluid pressures developed by said fuel pump; which pressure regulator has a movable member thereof constructed so as to move and thereby control the opening or closing of said control valve for said pump according to the pressure in the regulator; yielding means operable by the movable member of the pressure regulator to open said valve when pressure above a predetermined pressure is developed, and means automatically controlled by the speed-governing device of the engine for affecting the opening or closing of said valve from said regulator by changing the position of an adjusting member which is under the control of the speed-governing device of the engine and which adjusting member is in the form of a wedge and is located in the mechanism between the movable member of the pressure regulator and the control valve.

5. An apparatus to regulate the fuel pressure in the fuel line of a Diesel engine comprised of a plurality of fuel pumps having connections with the fuel nozzles of said engine; a valve in each pump to control the entry of fuel thereto; a pressure regulator, operable by the combined pressures developed in the fuel line by said pumps; means to connect said regulator to each of said valves to open the same when pressure above a predetermined pressure is developed in the fuel line, and means automatically controlled by the speed-governing device of the engine for affecting the functioning position of an adjusting member which is in the means that is relied upon to connect said regulator to said valve.

6. An apparatus to regulate the fuel pressure in the fuel line of a Diesel engine comprised of a plurality of fuel pumps having connections with the fuel nozzles of said engine; a valve in each pump to control the entry of fuel thereto; a pressure regulator, operable by the combined pressures developed in the fuel line by said pumps; said pressure regulator being dependent for its functioning upon a member proportionately positionable in accordance with the pressure within the regulator; means to connect the positionable member of said regulator to each of said valves to open the same when pressure above a predetermined pressure is developed in the fuel line; and means operable by the speed-governing device of the Diesel engine to vary the movement of said connecting means to cause the opening or closing of the valves in the pump by changing in said connecting means the position of an adjusting member thereof relative to its associated members.

7. An apparatus to regulate the fuel pressure in the fuel line of a Diesel engine comprised of a plurality of fuel pumps having connections with the fuel nozzles of said engine; a valve in each pump to determine the entry of fuel thereto; a pressure regulator, operable by the combined pressures developed in the fuel line by said pumps; a plunger in said regulator to be reciprocated proportionately to the pressure transmitted to said regulator from said fuel line; and a spring pressed finger pivoted adjacent each valve and normally held restrained as to the extent of its operative movement to open the valve by a positionable stop, which stop is operatively associated with said regulator so as to move and be proportionately positioned according to the pressure condition within the regulator.

8. An apparatus to regulate the fuel pressure in the fuel line of a Diesel engine comprised of a plurality of fuel pumps having connections with the fuel nozzles of said engine; the flow of fuel through the nozzle to the engine cylinder being under the control of the fuel valves of the engine; a valve in each pump to control the entry of fuel thereto; a pressure regulator, operable by the combined pressures developed in the fuel line by said pumps; means to connect said regulator to each of said valves to open the same when pressure above a predetermined pressure is developed in the fuel line; and means under the influence of the speed-governing device of the engine to control the relative position of certain members in the valve-operating mechanism to thereby cause the functioning of the valves in the pump from the valve-operating mechanism.

9. An apparatus to regulate the fuel pressure in the fuel line of a Diesel engine comprised of a plurality of fuel pumps having connections with the fuel nozzle of said engine; a valve in each pump to determine the entry of fuel thereto; a pressure regulator, operable by the combined pressures developed in the fuel line by said pumps; means to connect said regulator to each of said valves to open the same when pressure above a predetermined pressure is developed in the fuel line; and means for automatically causing the opening of said valves from said pressure regulator according to speed conditions of the engine.

10. An apparatus to regulate the fuel pressure in the fuel line of a Diesel engine comprised of a plurality of fuel pumps connected to said fuel line; a valve in each pump to determine the entry of fuel thereto; a pressure regulator, operable by the combined pressures developed in the fuel line by said pumps; a plunger in said regulator to be reciprocated proportionately to the pressure transmitted to said regulator from said fuel line; a shaft; spring pressed fingers on said shaft, each finger normally occupying a restrained position adjacent one of said valves, an arm on said shaft to be moved by said plunger to release said fingers to operate the valves when pressure above a predetermined amount is developed in said fuel line.

11. An apparatus to regulate the fuel pressure in the fuel line of a Diesel engine comprised of a plurality of fuel pumps connected to said fuel line; a valve in each of said pumps to control the entry of fuel thereto; a pressure regulator having a plunger therein to be reciprocated proportionately to the combined pressures developed by said pumps; a spring pressed finger pivoted adjacent each valve to open the same; means adapted to be operated by said plunger to operate said fingers; and means inserted between said plunger and said operating means to increase or decrease the effect of said plunger on said operating means, said last mentioned means being controlled as to position by the speed-governing device of the engine.

12. In combination, a Diesel engine including a fuel injection nozzle and associated needle valve; a lift rod to actuate the needle valve; an auxiliary lift rod operated by the engine to operate said lift rod; means to supply fuel under pressure to the injection nozzle; which last mentioned means comprises a plunger-operated valve which when open avoids the building up of excess pressure of the fuel supplied under pressure; a mechanism to control the fuel pressure admitted to the nozzle; which said mechanism has a plunger responsive to the pressure in the injection nozzle supply; a plunger-operated control valve; and means under the control of the governor of the engine to vary the distance between the auxiliary lift rod and the lift rod and also the opening or closing of the plunger-operated valve from and by said plunger.

13. In combination, a Diesel engine including a fuel injection nozzle and associated needle valve; a lift rod to actuate the needle valve; an auxiliary lift rod operated by the engine to operate said lift rod; means to supply fuel under pressure to the injection nozzle; a mechanism to control the fuel pressure admitted to said nozzle; a plunger responsive to the pressure in the injection nozzle supply to operate said mechanism; and operatively connected wedges inserted between the auxiliary lift rod and the lift rod and between the plunger and said mechanism, controlled by the speed-governing device of the Diesel engine.

14. In combination, a Diesel engine including a fuel injection nozzle and associated needle valve; a lift rod to actuate the needle valve; an auxiliary lift rod operated by the engine to operate said lift rod; means to supply fuel under pressure to the injection nozzle; a mechanism to control the fuel pressure admitted to said nozzle; a plunger responsive to the pressure in the injection nozzle supply to operate said mechanism; a wedge between the plunger and said mechanism; and a wedge between the lift rod and auxiliary lift rod; and means to advance and retract said wedges.

15. An apparatus to regulate the fuel pressure in the fuel line of a Diesel engine, comprising a fuel pump connected to said fuel line, a pressure regulator operable by the fluid pressures developed by said fuel pump, a valve in said pump to control the entry of fuel thereto, a plunger in said regulator adapted to be reciprocated proportionately to the pressure transmitted thereto, means operable by the plunger to control the opening or closing of the said valve according to the pressing in the regulator and thereby regulating the pressure developed in the fuel line, and means automatically controlled by the speed-governing device of the engine for varying the predetermined fuel pressure.

16. An apparatus to regulate the fuel pressure in the fuel line of a Diesel engine, comprising a fuel pump connected to said fuel line, a pressure regulator operable by the fluid pressure developed by said fuel pump, a valve in said pump to control the entry of fuel thereto, a plunger in said regulator adapted to be reciprocated proportionately to the pressure transmitted thereto, means operable by the said plunger to control the opening or closing of the said valve to thereby regulate the pressure developed in the fuel line, and means controlled by the speed-governing device of the Diesel engine to vary the movement of the said means for varying the pressure developed in the fuel line.

In testimony whereof, I have hereunto set my hand at San Francisco, California, this 6 day of May 1926.

JOHN W. LORIMER.